Dec. 5, 1950  S. G. WINGQUIST  2,532,433
UNIVERSAL JOINT
Filed June 26, 1945

Inventor
S. G. Wingquist

Patented Dec. 5, 1950

2,532,433

UNITED STATES PATENT OFFICE 2,532,433

UNIVERSAL JOINT

Sven Gustaf Wingquist, Goteborg, Sweden

Application June 26, 1945, Serial No. 601,557
In Sweden July 4, 1944

10 Claims. (Cl. 64—21)

The invention relates to universal joints of the type having a single centre of deflection and comprising a driving and a driven joint member, each having arms provided with races between which are interposed rollers for transmitting motion between the joint members.

In the joints of this type the joint members may have outer spherical surfaces of the same radius and be surrounded by a housing member having an inner spherical surface fitting on the outer spherical surfaces of the joint members. In order to make it possible to introduce the spherical joint members into the spherical housing member it is usual to make the housing member in two parts which are placed on the joint members and then secured to each other.

The invention relates to a universal joint of this type. According to the invention the housing member is made in one piecce and is provided with grooves or recesses on the inside permitting introduction of the joint members into the housing member to positions in which all the spherical surfaces are concentric.

In a preferred embodiment there are as many grooves in the housing member as there are arms on each joint member, and further the grooves are on the same side of a radial plane passing through the centre of the joint, the grooves extending from one end of the housing member only to the said radial plane. In this case the joint members are introduced into the housing member from the same end thereof, one after another, and are then turned to correct positions. The housing member takes up any pull on the joint members in an axial direction and may also serve to prevent movement of the rollers in an outward direction. For this purpose the rollers at their outer ends may have spherical surfaces engaging with the inner spherical surface of the housing member, and in this case the grooves are so arranged that in the assembled state of the joint they do not interfere with the proper functioning of the rollers.

Figure 1:
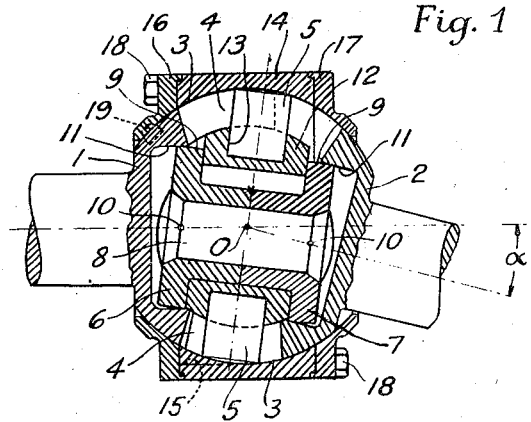
Figure 2:
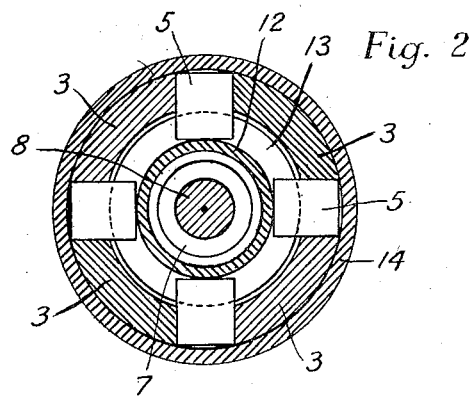
Figure 3:
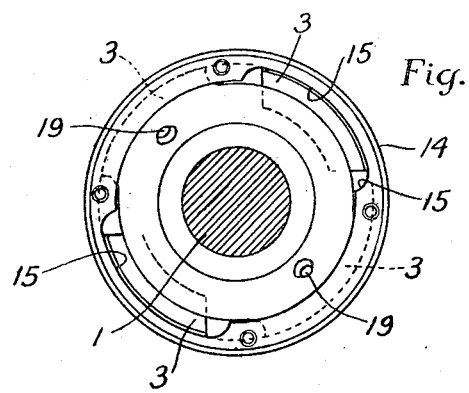

One embodiment of the invention will be described in the following with reference to the accompanying drawing in which Fig. 1 shows an axial section, Fig. 2 a radial section and Fig. 3 a view from one end, part of the covering being removed.

In the figures 1 denotes the driving and 2 the driven joint member, each provided with two arms 3 having outer spherical surfaces of the same radius the centre of which coincides with the centre O of deflection of the joint. The arms have races 4 and between these are interposed rollers 5.

For guiding the rollers in the bisector plane the following means are provided.

Centrally between the joint members is provided a bisecting member composed of two halves 6 and 7 held together by means of a bolt 8. The bisecting member 6, 7 has portions 9 which on the outside are spherical, the centres 10 of the spheres being on the axis of the joint, symmetrically relatively to the centre O. The spherical portions 9 rest in cylindrical seats 11 in the joint members 1 and 2.

12 denotes a roll holder which is slidable in the bisecting member in such a way that in each position it is always in a plane through the centre of the bisecting member and at right angles to the axis thereof. In the roll holder the rollers 5 are mounted in a groove 13; in the embodiment shown they are cylindrical. Owing to the symmetrical position of the bisecting member relatively to the centres 10 the bisecting member for each angle of deflection $a$ always deviates by an angle $$\frac{\alpha}{2}$$

from the original position at right angles to the axis of the joint and thus also the rollers guided by the roll holder take up this position, i. e. are always guided in the bisector plane of the joint members. When the joint members are angularly deflected the roll holder turns about the centre O, in the plane of the paper in Fig. 1, whereas the bisecting member is displaced in such manner, as shown in Fig. 1, that the centre axis thereof no longer passes through the centre O.

The joint members are held together in an axial direction by a housing member 14 having an inner spherical surface fitting on the outer spherical surfaces of the joint members. In order to make it possible to introduce the joint members into the housing member and the latter is provided with two axial grooves 15, compare Figs. 1 and 3, which from one end of the housing member extend to the radial central plane of the joint and in the embodiment shown, in which there are two diametrically opposed arms on each joint member, are diametrically opposed. For assembling the joint the right joint member 2 is first introduced into the housing member from left to right in Fig. 1, the bisecting member with the roll holder is then placed in position in the joint member 2 and the latter is turned in a peripheral direction so that the arms no longer register with the grooves in the housing member, when the other joint member 1 can be introduced, also from left to right. The housing member is then turned in the plane of the paper in Fig. 1 until the rollers can be inserted, one after another, and the two annular lids 16 and 17 are then secured to the housing member by means of the bolts 18. Together with the housing member the lids form a cover for sealing and protecting the joint. In order to secure the cover to one of the joint members one of these may be provided with projections 19 entering corresponding depressions in the corresponding lid; other means for securing the lid to the joint member may of course be employed. The lid 16 should be fixed relatively to the joint member 1 in such manner that the arms 3 are turned 90° away from the grooves 15.

The rollers at the outer ends have spherical surfaces engaging with the spherical inside of the housing member whereby they are prevented from outward movement in a radial direction. The rollers are thus guided in all directions except that they are free to roll between the races.

Modifications are of course possible within the scope of the invention and the number of arms on each joint member may be more than two in which case a corresponding number of grooves in the housing member are required.

In the embodiment shown the arms 3 on the inside have spherical surfaces of the same radius and the roll holder 12 has an outer spherical surface engaging with the inner spherical surfaces of the arms. Any pressure on the joint members in an axial direction is therefore taken up by the roll holder, whereas pull in the axial direction is taken up by the housing member.

What I claim is:

1. Universal joint having a single centre of deflection and comprising a driving and a driven joint member, arms on the joint members, outer spherical surfaces on the arms of the same radius, races on the arms, rollers interposed between the races, an undivided housing member surrounding the joint members and extending on both sides of a radial plane through the center of the joint, an inner spherical surface on the housing member fitting on the outer spherical surfaces on the arms of the joint members, and axially directed recesses on the inside of the housing member adapted for introducing the joint members.

2. Universal joint as claimed in claim 1 in which the number of recesses on the inside of the housing member is the same as the number of arms on each joint member.

3. Universal joint as claimed in claim 1 in which the number of recesses on the inside of the housing member is the same as the number of arms on each joint member and the recesses from the same end of the housing extend only to a radial plane through the centre of deflection of the joint.

4. Universal joint as claimed in claim 1 in which a lid is provided secured to the housing member and to one of the joint members.

5. Universal joint as claimed in claim 1 in which a lid is provided secured to the housing member and to one of the joint members, the joint member to which the lid is secured having projections entering corresponding depressions in the lid.

6. Universal joint as claimed in claim 1 having two lids secured to the housing member on opposite sides thereof so as to form with the housing member a complete cover for sealing the joint at all angles of deflection of the joint members, one of the lids being secured to one of the joint members.

7. Universal joint as claimed in claim 1 having two lids secured to the housing member on opposite sides thereof, the lids having inner spherical surfaces fitting on the outer spherical surfaces of the joint members and one of the lids being secured to one of the joint members, the joint member to which the lid is secured having projections entering corresponding depressions in the lid.

8. Universal joint having a single centre of deflection and comprising a driving and a driven joint member, arms on the joint members having outer spherical surfaces of the same radius, races on the arms, rollers interposed between the races, means for guiding the rollers in the bisector plane of the joint members, a housing member surrounding the joint member, an inner spherical surface on the housing member fitting on the outer spherical surfaces of the joint members, grooves on the inside of the housing member extending from the same end thereof only to a radial plane through the centre of deflection of the joint, and adapted for introduction of the joint members into the housing member, and two lids secured to the housing member on each side thereof and having inner spherical surfaces engaging with the outer spherical surfaces of the joint members, one of the lids being secured to one of the joint members.

9. Universal joint as claimed in claim 8 in which the joint members have inner spherical surfaces of the same radius and a roll holder for the rollers is provided having an outer spherical surface engaging with the inner spherical surfaces of the joint members.

10. Universal joint having a single center of deflection and comprising a driving and a driven joint member, arms on the joint members, outer spherical surfaces on the arms and of the same radius, races on the arms, rollers interposed between the races, an undivided housing member surrounding the joint members and extending on both sides of a radial plane through the center of the joint, an inner spherical surface on the housing member fitting on the outer spherical surfaces on the arms of the joint members, and axially directed recesses on the inside of the housing member and on the same side of the radial plane through the center of the joint and from one end of the housing member extending only to that plane for introduction of the joint members into the housing member one after the other.

SVEN GUSTAF WINGQUIST.

REFERENCES CITED

The following references are of record in the file of this patent:

UNITED STATES PATENTS

| Number | Name | Date |
| --- | --- | --- |
| 1,160,213 | Tappan | Nov. 16, 1915 |
| 1,450,805 | Hart-Spratt | Apr. 3, 1923 |
| 1,728,949 | Weiss | Sept. 24, 1929 |
| 2,033,733 | Myard | Mar. 10, 1936 |